POWER LINE CARRIER FREQUENCY TELEPHONE SYSTEM

Filed Oct. 11, 1946 2 Sheets-Sheet 1

INVENTORS J.M. BARSTOW
A.G. LANG
BY R.O. Covell
ATTORNEY

June 13, 1950 J. M. BARSTOW ET AL 2,511,615

POWER LINE CARRIER FREQUENCY TELEPHONE SYSTEM

Filed Oct. 11, 1946 2 Sheets-Sheet 2

INVENTORS J. M. BARSTOW
A. G. LANG
BY R. O. Covell
ATTORNEY

Patented June 13, 1950 2,511,615

UNITED STATES PATENT OFFICE 2,511,615

POWER LINE CARRIER FREQUENCY TELEPHONE SYSTEM

John M. Barstow, Mountain Lakes, N. J., and Albert G. Lang, Whitestone, N. Y., assignors to Bell Telephone Laboratories, Incorporated, New York, N. Y., a corporation of New York Application October 11, 1946, Serial No. 702,733

10 Claims. (Cl. 179—2.5)

Figure 1:
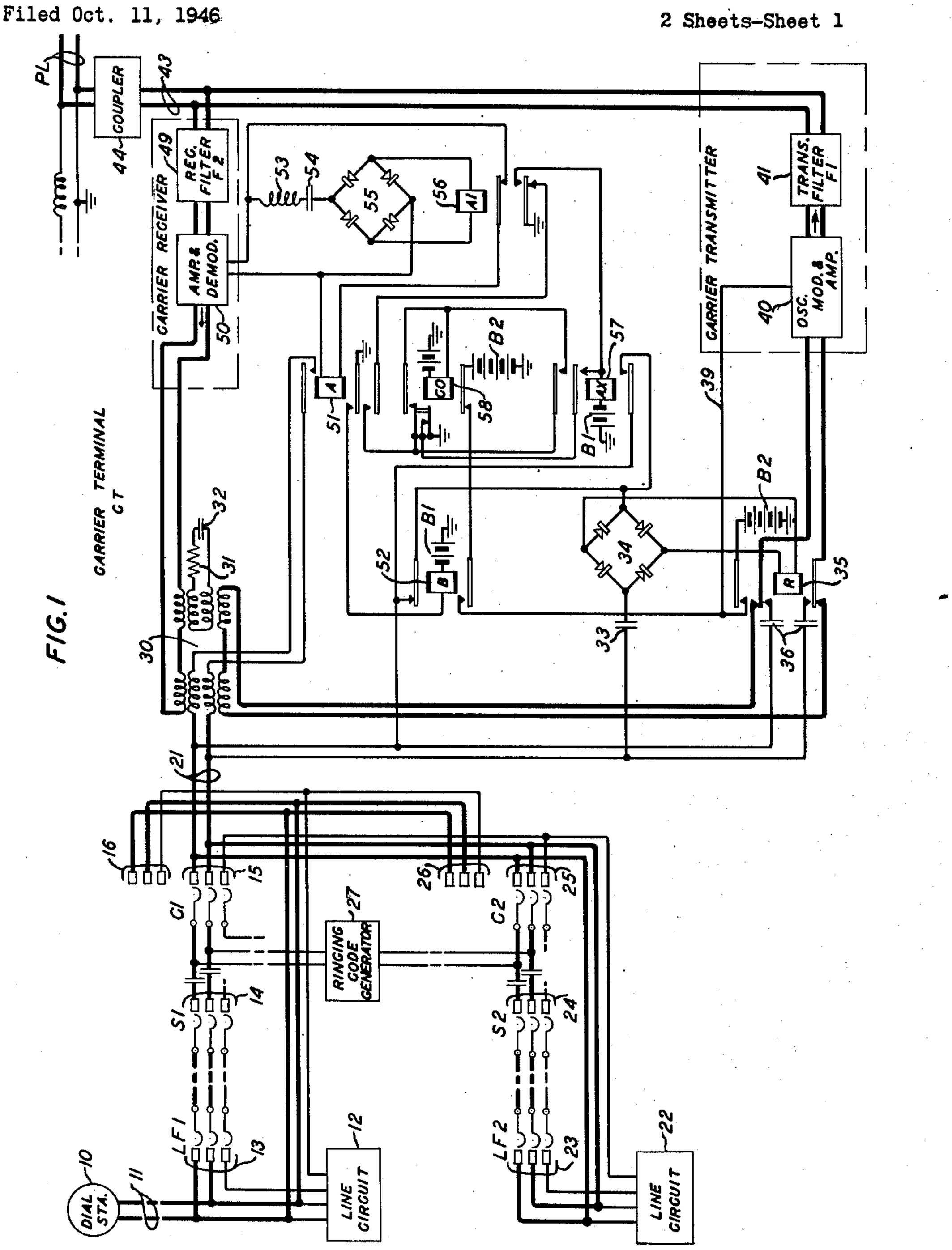

This invention relates to communication systems and particularly to telephone systems including subscriber stations arranged for carrier current operation over a power transmission line.

Objects of the invention are the provision of carrier telephone service over power transmission lines, the provision of means for indicating that a call is a reverting call to enable the guarding of a telephone line connected to a power line against seizure when the calling subscriber at a power line telephone station returns the receiver to normal to start ringing of the called station, and to guard the line against seizure on a reverting call as long as the receivers have not been replaced on the receiver hook at both the calling and the called carrier stations.

This invention is a telephone system including subscriber stations arranged for carrier current operation over a power transmission line, carrier current of one frequency being used for transmitting over the power line voice and signal currents to any one of these stations and carrier current of another frequency being used for transmitting over the power line voice and signal currents from any one of these stations except that on reverting calls the carrier frequencies for transmitting voice and signal currents to and from the calling station are automatically interchanged.

A feature of the invention is a telephone system comprising subscriber stations arranged for carrier current operation over a power transmission line which is connected through a carrier terminal equipment to a telephone line to a central office, each carrier station being provided with signaling means for transmitting a reverting call signal consisting of carrier current modulated at the power frequency, thereby to disable the transmission of carrier current from the carrier terminal equipment during conversation between the calling and called stations. The means for transmitting this signal includes a manually operated key which is unlocked when the receiver hook is restored to normal at the calling station to start ringing of the called station.

Another feature of the invention is a telephone system comprising subscriber stations arranged for carrier current operation over a power transmission line which is connected through a carrier terminal equipment to a telephone line to a central office, the transmission of carrier current over the power line from the carrier terminal equipment being terminated responsive to a reverting call signal consisting of carrier current modulated at the power frequency transmitted from the calling station.

A clear and complete understanding of the invention will be facilitated by considering a system in which the invention and its features are embodied, such a system being represented schematically in the drawings. The invention is, however, not limited in its application to the particular system shown but is generally applicable to telephone systems.

The drawing, which consists of two figures, schematically represents an automatic telephone exchange serving subscriber stations some of which are arranged for carrier current operation over a power transmission line.

Fig. 1 shows an automatic telephone exchange comprising a subscriber station 10, subscriber lines 11 and 21 and line circuits 12 and 22, line-finder switches LF1 and LF2, selector switches S1 and S2, connector switches C1 and C2, a carrier terminal station or equipment unit CT individual to the line 21, and a power transmission line PL to which the carrier terminal equipment CT is coupled by coupling means 44.

Figure 2:
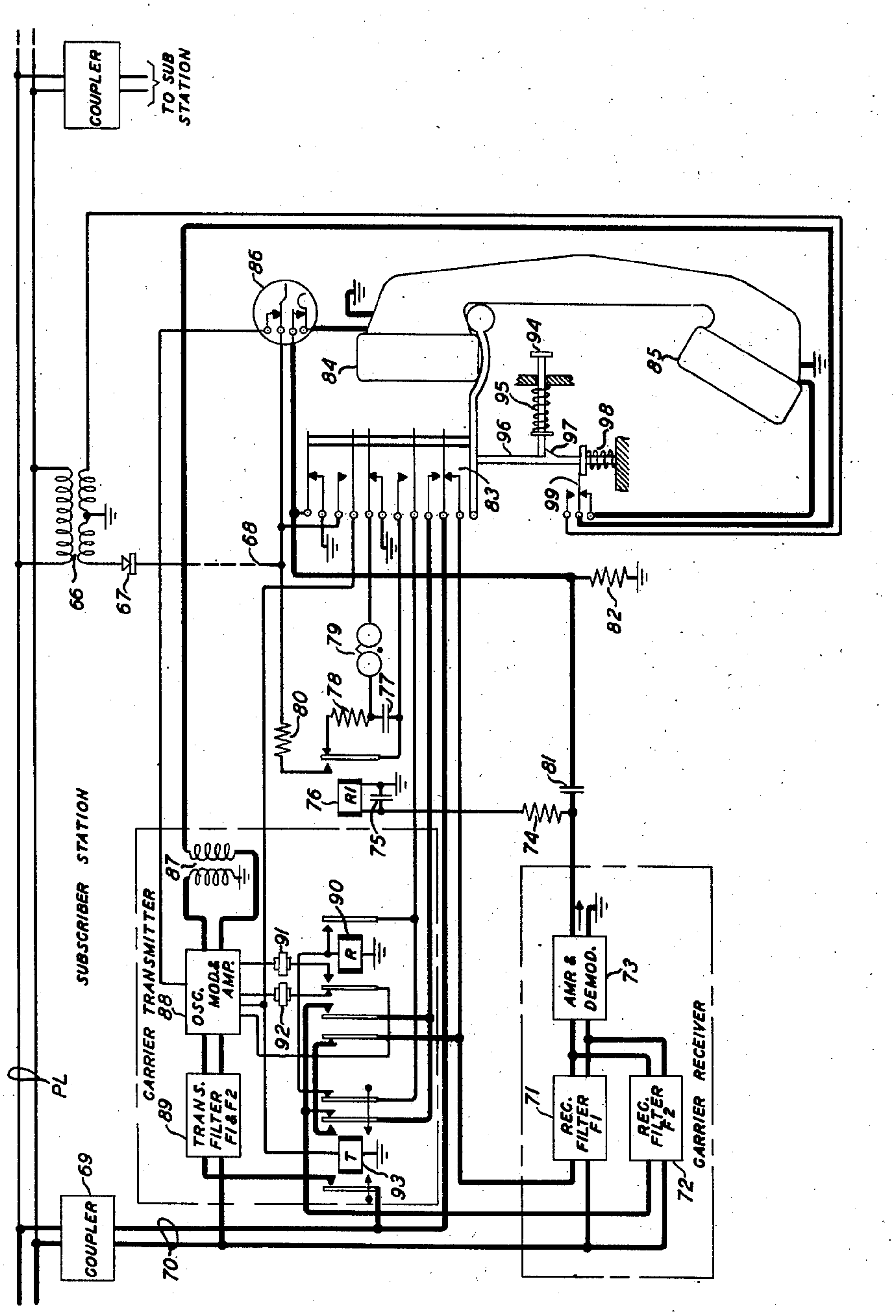

Fig. 2 shows one of a plurality of subscriber stations connected to, and arranged for carrier current operation over, power line PL.

The subscriber station 10 is of the usual type provided for use on lines terminating in an automatic central office and includes a dial or other impulse sender (not shown) for use in selectively controlling the switches through which desired connections are established. The line finder, selector and connector switches are of the two-motion step-by-step type, each of the line-finder and selector switches being represented in the drawing by a set of brushes and a single set of terminals and each of the connector switches being represented by a set of brushes and two sets of terminals. The relays and other apparatus associated with the line-finder, selector and connector switches is represented by broken lines. Reference may be had to "Automatic Telephony" by Smith and Campbell, 2nd edition, pages 53 to 65, inclusive, for a detailed description of the structure of such switches and their operation when used as selectors and connectors. Reference may be had to the patent to R. L. Stokely No. 1,799,654, granted April 7, 1931, for a detailed disclosure of a line circuit and a line finder of the step-by-step type. The ringing code generator 27 comprises a source of ringing current and means for interrupting the ringing supply conductors as required to produce a plurality of different ringing codes for signaling subscriber stations. Reference may be had to the patent to Duguid, No. 2,225,907, granted December 24, 1940, for disclosure of such a ringing code generator and to the patent to Koechling, No. 2,289,503, granted July 14, 1942, for a detailed disclosure of a connector switch arranged for ten-party code ringing.

The carrier terminal equipment CT, power line PL, and the carrier telephone stations of Fig. 2 constitute a power line carrier telephone system similar generally to the system disclosed in the copending application of R. C. Edson and J. W. Emling, Serial No. 653,254, filed March 9, 1946 now U. S. Patent No. 2,481,915, issued Sept. 13, 1949 to which application reference may be had for discussion of the carrier frequencies suitable for use in such systems and disclosure of the coupling means between the carrier equipment and the power line and other details of the carrier terminal equipment CT and the carrier telephone stations. The power line PL is one phase of a power transmission line which serves a plurality of power and light customers, some of which are equipped for carrier telephone service as shown in Fig. 2.

The carrier terminal equipment CT comprises a carrier transmitter, a carrier receiver, and a hybrid coil or group of transformer windings 30 arranged to transmit signal and voice currents to and from line 21. The resistor 31 and condenser 32 constitute a network connected to the middle right pair of windings to balance the line 21. The upper pair of windings receive voice frequency currents from the carrier receiver comprising amplifier-demodulator 50; and the lowest pair of windings transmit voice frequency currents from line 21 to the input circuit of the carrier transmitter comprising oscillator-modulator-amplifier apparatus 40. The power line PL is connected through coupling means 44 and conductors 43 to the carrier receiver comprising receiving band filter 49 and amplifier-demodulator 50, and to the carrier transmitter comprising transmitting band filter 41 and oscillator-modulator-amplifier 40. The oscillator-modulator 40 is tuned to generate and transmit through filter 41, carrier current of frequency F1, modulated by either signaling or voice currents incoming to hybrid coil 30 from line 21. The amplifier-demodulator 50 receives, through filter 49 from the power line PL, carrier current of frequency F2 modulated by voice and signal currents from any one of the carrier telephone stations connected to the power line PL. The transmitting and receiving filters 41 and 49 transmit the voice frequency sidebands in addition to the carrier frequency. The oscillator-modulator-demodulator and amplifier apparatus may be of any known suitable type. The carrier terminal equipment CT further comprises relay 35 controlled by ringing current incoming over line 21 to energize the oscillator-modulator-amplifier 40 and thereby transmit impulses of carrier current over the power line corresponding to the ringing code received by relay 35 from line 21. The carrier terminal equipment CT further comprises relays 51, 52, 56, 57 and 58 controlled by amplifier-demodulator 50. The functions of each of the relays is hereinafter described in detail.

Each of the carrier telephone stations is similar to the one shown in Fig. 2 and is connected through individual coupling means 69 to the power line PL. Each station comprises a carrier receiver, a carrier transmitter, a telephone receiver 84 and transmitter 85 combined in a handset which normally rests on the receiver hook 83, a dial 86 for controlling automatic switches in the central office to establish desired connections, a relay 76 and a ringer 79. The carrier receiver comprises a receiving band filter 71 tuned to the carrier frequency F1, a receiving band filter 72 tuned to the carrier frequency F2, and amplifier-demodulator apparatus 73. The carrier transmitter comprises oscillator-modulator-amplifier apparatus 88, a transmitting band filter 89, a frequency control relay 90, oscillator crystals 91 and 92, and a relay 93 for connecting the output of filter 89 to the power line. The receiving and transmitting filters 71, 72 and 89 transmit the voice frequency sidebands in addition to the carrier frequency. The oscillator, modulator, demodulator and amplifier apparatus may be of any known suitable type. The power supply for the amplifier, modulator and demodulator apparatus includes a rectifier 67 and a transformer 66 connected to the power line PL either directly or through an intermediate transformer. Other transformer windings may supply the energy for heating the filaments of vacuum tubes and supply whatever other operating potentials are required. A key 94 is provided for effecting the transmission of a reverting call signal. While the receiver hook 83 is in its off-normal position, the key 94 may be pulled to the right to disengage the detent 97 of bar 96. When thus released, the bar 96 is moved upward by spring 98 to actuate the contact springs 99, whereby the transmitter 85 is disconnected from the input side of oscillator-modulator-amplifier 88 and the lower right winding of transformer 66 is connected to the input of modulator-amplifier 88 to effect the transmission of a reverting call signal as hereinafter described in detail. When the handset is restored to normal, bar 96 is moved downward against the tension of spring 98 to restore contacts 99 to normal position in which the bar 96 is locked by the engagement of key 94 and detent 97.

*Call from station 10 to a carrier telephone station*

Assume that a call is initiated at station 10, that the line 11 is connected by a line finder LF1 to a selector S1, that the selector S1 is selectively controlled by dial impulses from station 10 to select a group of trunks and an idle trunk therein associated with a connector C1, and that the connector C1 is selectively controlled by dial impulses from station 10 to select the line 21. Assume further that the line 21 is idle when selected and tested by connector C1, that a ringing code is selected responsive to dial impulses from station 10, and that the selected ringing code is transmitted through the brushes of connector C1 over the conductors of line 21, through condenser 33, rectifier 34, and a back contact of relay 52 to the winding of relay 35. Relay 35 is thereby operatively energized during each ringing interval of the ringing code transmitted over line 21. The operation of relay 35 connects the positive pole of battery B2 to conductor 39 to energize oscillator-modulator-amplifier 40 and connects line 21 through condensers 36 to the input conductors of oscillator-modulator 40 whereby ringing modulated carrier current of frequency F1 is transmitted through filter 41, conductors 43, and coupling means 44, over the power line PL, to each of the carrier telephone stations connected to the power line. At each of these stations, the incoming ringing modulated carrier current of frequency F1 is transmitted through a coupler 69, conductors 70, and a normally closed contact of the springs controlled by receiver hook 83, through filter 71, to the input circuit of amplifier-demodulator 73. The output circuit of amplifier-demodulator 73 includes resistor 74 and the winding of relay 76; and relay 76 is operated responsive to carrier current incoming over the power line. A condenser 75, connected in parallel with the winding of relay 76, renders this relay somewhat slow in operating so as to tend to prevent its operation responsive to interference currents such as static. The output conductor of demodulator 73 is further connected through condenser 81 and the off-normal contact of dial 86 to telephone receiver 84, in parallel with resistor 82. While the telephone handset is in normal position on hook 83, the receiver 84 and resistor 82 are short-circuited at a back contact of the receiver-hook contact springs. The operation of relay 76 closes a circuit from the left lower winding of transformer 66 through rectifier 67, conductor 68, resistor 80, front contact of relay 76, condenser 77 and through the windings of ringer 79 to ground at a back contact of the springs of hook 83. The windings of ringer 79 are thereby energized while condenser 77 is charging. Since the incoming carrier current of frequency F1 is modulated by the ringing current over line 21, relay 76 is alternately operated and released at the ringing current frequency (for instance 16 cycles per second) during each ringing interval of the ringing code. Each time relay 76 releases, condenser 77 discharges through resistor 78; and each time relay 76 reoperates, condenser 77 is charged through ringer 79. Thus the ringer at each carrier telephone station is actuated in accordance with the ringing code of the particular station which is being called.

When the handset is removed at the called station, the circuit through ringer 79 is opened, the short circuit across the receiver 84 is opened, and the positive potential supply conductor 68 is connected to the winding of relay 93 and to the oscillator-modulator-amplifier 88, operating relay 93 and energizing the oscillator-modulator-amplifier apparatus 88. Relay 93 is somewhat slow in operating to allow time for relay 90 to operate if relay 76 is operated at the time the handset is removed as is the case at the calling station on a reverting call as hereinafter described. However, on the call being described, relay 76 is not operated at the called station when the handset is removed, because at this time there is no carrier current of frequency F2 being transmitted over the power line, and therefore relay 90 is not operated. Relay 93 connects the output conductors of filter 89 across conductors 70, and connects the input conductors of filter 71, through a receiver hook contact and a back contact of relay 90, across conductors 70. Relay 76 is therefore reoperated responsive to carrier current of frequency F1 incoming over the power line PL from the carrier terminal equipment CT; but relay 90 cannot operate since the operation of relay 93 opened the connection between the contact spring of relay 76 and the winding of relay 90. With relay 90 normal, the oscillator crystal 92 is connected through the inner left back contact of relay 90, in the oscillator circuit of oscillator-modulator 88; and carrier current of frequency F2 is transmitted from the oscillator-modulator-amplifier 88 through filter 89 and a front contact of relay 93, through conductors 70 and coupling means 69, over power line PL to each of the other carrier stations and to the carrier terminal equipment CT. At the other carrier telephone stations, this carrier current does not reach the demodulator 73 because the input circuit of filter 72 is open as long as the handset is in normal position on hook 83; but at the carrier terminal equipment CT, this carrier current of frequency F2 passes through coupler 44, conductors 43, and receiving band filter 49 to the input circuit of amplifier-demodulator 50 causing the operation of relay 51. Relay 56 is not operated at this time because the input to rectifier 55 is series tuned by inductance 53 and condenser 54 to the frequency of the power source connected to line PL. The operation of relay 51 closes a circuit for operating slow-to-release relay 52 and closes a bridge including the middle left pair of windings of hybrid coil 30 across the conductors of line 21, thereby to operate the ringing trip relay (not shown) of the connector C1 and thus terminate the transmission of ringing current over line 21 and close the talking circuit through connector C1 between lines 11 and 21. The operation of relay 52 opens the circuit connection between the winding of relay 35 and line 21, and connects the postive pole of battery B2 to conductor 39 to energize the oscillator-modulator-amplifier 40. Voice currents incoming over line 21 from station 10 modulate the carrier current of frequency F1 transmitted from modulator-amplifier 40, through filter 41, over the power line PL to each of the carrier telephone stations. At the called carrier telephone station, the carrier current of frequency F1 incoming through filter 71 to amplifier-demodulator 73 effects the operation of relay 76 and the demodulated voice currents are transmitted through receiver 84. At each of the other carrier telephone stations, relay 76 is operated responsive to the carrier current of frequency F1 incoming to the amplifier-demodulator 73, but the receiver 84 is short circuited; and since relay 76 is continuously energized, no operation of the ringer 79 results. At the called station voice currents from the transmitter 85 are transmitted through coil 87 to the input circuit of modulator-amplifier 88, therein to modulate the carrier current of frequency F2 which is being transmitted over the power line PL, through coupler 44, conductors 43 and filter 49 to the amplifier-demodulator 50 of carrier terminal equipment CT, the voice currents being further transmitted through hybrid coil 30 over line 21 to the calling station 10. Thus talking proceeds between the calling station 10 and the called carrier telephone station.

When the handset is replaced on hook 83 at the called station, the receiver 84 is short-circuited, relay 93 is released and the oscillator-modulator-amplifier 88 is deenergized, terminating the transmission of carrier current of frequency F2 over line PL, and thereby causing the successive release of relays 51 and 52 of the carrier terminal equipment CT. The release of relay 51 opens the bridge across line 21, releasing the answering supervisory relay (not shown) of connector C1. The release of relay 52 disconnects battery B2 from conductor 39 to deenergize the oscillator-modulator-amplifier 40 and thus terminate the transmission of carrier current of frequency F1 over the power line. When the transmission of carrier current of frequency F1 over line PL ceases, relay 76 releases at each of the carrier subscriber stations. When the receiver is restored to normal at the calling station 10, the connector C1, selector S1 and line finder LF1 are restored to normal in usual and well-known manner.

*Call from carrier station*

Assume next that the handset is removed from hook 83 at one of the carrier stations connected to power line PL to initiate a call. Relay 93 is thereby operated, relay 90 remains normal, and the oscillator-modulator-amplifier 88 is energized to transmit carrier current of frequency F2 over power line PL, causing the successive operation of relays 51 and 52 of the carrier terminal equipment CT, as above described. At each of the other carrier stations, the carrier current of frequency F2 transmitted over line PL from the calling station is ineffective to operate relay 76 because the input conductors 70 are normally connected across the input of filter 71 and are not normally connected across the input conductors of filter 72. The operation of relay 51 closes the bridge across line 21 to operate the line relay (not shown) of line circuit 22 and thus start the operation of an idle line finder LF2 to connect with line 21; and line 21 is thereby connected to the associated selector S2. The operation of relay 52 opens the circuit connection between relay 35 and line 21 and connects battery B2 to the oscillator-modulator-amplifier 40. Dial tone is transmitted from selector S2 over line 21 through hybrid coil 30 to the input of modulator-amplifier 40; and dial tone modulated carrier current of frequency F1 is transmitted through filter 41 over power line PL to the carrier telephone stations. The carrier current of frequency F1 effects the operation of relay 76 at each of these stations; and, at the calling station, the dial tone is transmitted through receiver 84 as an indication that dialing, of the number of the telephone station with which connection is desired, may be started. Each time a digit is dialed, the receiver is disconnected by actuation of the off-normal contacts of the dial from the amplifier-demodulator 73; and the impulse contacts of the dial alternately open and close the circuit supplying energy to the modulator-amplifier 88 whereby the carrier current of frequency F2 being transmitted over line PL is interrupted momentarily responsive to each dial impulse. At the carrier terminal equipment CT, relay 51 is alternately released and reoperated responsive to each dial impulse of the train of impulses transmitted over line PL corresponding to a dialed digit; and relay 51 thus repeats each train of dial impulses over line 21 to control the selector S2 and a connector C2 to establish connection with the called line and to select the ringing code which is to be transmitted over the called line to signal the called subscriber station. Since the input to rectifier 55 is tuned to respond to 60 impulses of carrier current per second, and the dial impulse frequency is not more than 20 impulses per second, relay 56 remains normal during the transmission of dial impulses. Relay 52 is slow-to-release and remains operated during the response of relay 51 to dial impulses. Assume first that the called station is not another one of the carrier subscriber stations connected to power line PL. Ringing current of the selected code is transmitted through the brushes of connector C2 over the called line; and, when the called subscriber answers the call, the ringing circuit is opened and the talking path is completed through connector C2 between the calling and called stations. Release of the connection is under the control of the calling station. When the handset is restored to normal at the calling carrier subscriber station, relay 93 releases and amplifier-modulator 88 is deenergized, terminating the transmission of carrier current of frequency F2 over power line PL and thus causing the successive release of relays 51 and 52 of carrier terminal equipment CT. The release of relay 51 opens the bridge across line 21 to effect the return of the line finder LF2 and selector S2 to normal; and the connector C2 is also returned to normal when the connection has been released at both the calling and called stations.

Assume next that a call initiated at one of the carrier telephone stations, as above described, is a call to another one of the carrier stations connected to power line PL, such a call being known as a reverting call. In such a case, the connector C2 finds the called line 21 busy when it makes the usual busy test; and a busy tone is transmitted from connector C2 through selector S2 and line finder LF2 over line 21, through hybrid coil 30, modulator amplifier 40, filter 41, power line PL, filter 71, amplifier-demodulator 73, and condenser 81, to the telephone receiver 84 at the calling station. The connector C2 is also arranged to make a reverting call test to determine whether the called line is busy because the call is a reverting call. If the call is a reverting call, the line finder LF2 and selector S2 are restored to normal when the calling subscriber replaces the receiver; but the connector C2 remains connected to line 21 to ring the called station. Reference may be had to the patent to H. Hovland, Patent No. 1,849,087, granted March 15, 1932, for disclosure of a connector arranged to make the aforementioned reverting call test. Upon hearing the busy tone transmitted from connector C2, the calling subscriber pulls out the reverting call key 94 and then later restores the handset to normal on the receiver hook 83. The operation of key 94 releases the bar 96 so that contact springs 99 are actuated to disconnect transmitter 85 from coil 87 and connect the right lower winding of transformer 66 to coil 87 so as to modulate the carrier frequency output of modulator-amplifier 86, with current of the power frequency. When the handset is hung on the hook 83, relay 93 releases, contacts 99 are restored to normal and locked, and oscillator-modulator-amplifier 88 is deenergized, thereby terminating the transmission carrier current of frequency F2. The impulse of power frequency modulated carrier current of frequency F2, thus transmitted over the power line PL from the calling station, is without effect at any of the other telephone stations connected to line PL; but, at the terminal carrier equipment CT, relay 56 is operated by the rectified output of amplifier-demodulator 50, inductance 53 and condenser 54 being tuned to series resonance at the power frequency. The operation of relay 56 opens the operating path through the winding of relay 51 and closes a circuit for operating relay 57. Relay 57 locks under control of relay 58, partially closes a circuit for operating relay 58, and connects the winding of ringing relay 35 to line 21. The release of relay 51 opens the loop across line 21 to effect the aforementioned release of the line finder LF2 and selector S2 and to effect the closing of the ringing circuit in connector CT, whereby ringing current is transmitted over line 21 to operate relay 35 according to the ringing code of the called station. Although relay 52 releases due to the release of relay 51, the operation of relay 35 connects battery B2 to energize oscillator-modulator-amplifier 40; and ringing current is transmitted through condensers 36 and front contacts of relay 35 to the input conductors of modulator-amplifier 40, whereby ringing modulated carrier current of frequency F1 is transmitted over line PL to each of the carrier subscriber stations to actuate the ringers according to the ringing code of the called station.

When the handset is removed from hook 83 at the called station to answer the call, relay 93 is operated, oscillator-modulator-amplifier 88 is energized to transmit carrier current of frequency F2, and the input of filter 71 is connected across conductors 70. The carrier current of frequency F2 transmitted over line PL from the answering called station is without effect at the other carrier stations but causes the reoperation of relays 51 and 52 of the carrier terminal equipment CT. The operation of relay 51 closes the bridge across line 21 to trip the ringing and close the talking path through connector C2; relay 51 also closes a circuit including a front contact of relay 57 and the back contact of relay 56 for operating relay 58. Relay 58 locks under control of relays 51 and 56 and causes the release of relay 57. With relay 58 operated and relay 35 normal, the oscillator-modulator-amplifier 40 remains deenergized after ringing is tripped in the connector C2 so that carrier current of frequency F1 is not transmitted from the carrier terminal equipment CT.

When the operation of the ringer at the calling station ceases due to answer at the called station, the calling subscriber removes the handset from hook 83, thereby closing the connection from power line PL through conductors 70 and filter 72 to the input conductors of amplifier-modulator 73. At this time carrier current of frequency F2 is being received over line PL from the called station, and the current in the output circuit of amplifier-demodulator 73 operates relay 76; and before the slow-to-operate relay 93 responds to the removal of the handset from hook 83, relay 76 closes a circuit for operating relay 90. Relay 90 locks independent of relay 93 and includes crystal 91 in the oscillator circuit of oscillator-modulator 88 at the calling station in place of crystal 92 to transmit carrier current of frequency F1 over line PL to the called station. Relay 93 operates after relay 90 has locked to open the operating circuit of relay 90 and to connect the output of filter 89 across conductors 70. With relay 90 operated at the calling station, the connection between conductors 70 and the input of filter 72 is maintained until the handset is restored to normal. The calling and called stations are now in condition for conversation over the power line, voice currents from the transmitter 85 at the calling station, being effective to modulate the carrier current of frequency F1 transmitted from the modulator-amplifier 88 at the calling station, and voice currents from the transmitter 85 at the called station being effective to modulate the carrier current of frequency F2 transmitted from the modulator-amplifier 88 at the called station. The aforementioned deenergization of oscillator-modulator-amplifier 40 of the carrier terminal equipment CT prevents interference which might otherwise result from a beat between current of frequency F1 transmitted therefrom and carrier current of frequency F1 transmitted from the calling station.

The release operations on a reverting call vary according to the order in which the calling and called subscribers disconnect. If the calling subscriber hangs up first, relays 90 and 93 release and oscillator-modulator-amplifier 88 is deenergized at the calling station; but no change occurs at the carrier terminal equipment CT until the called subscriber also hangs up. When the called subscriber hangs up, relay 93 releases and the oscillator-modulator-amplifier 88 is deenergized thus terminating the transmission of carrier current of frequency F2 over power line PL; and relays 51 and 52 of the carrier terminal equipment CT release in succession. The release of relay 51 opens the bridge across line 21 to effect release of the connector C2 and causes the release of relay 58.

If the called subscriber hangs up first, relay 93 releases and oscillator-modulator-amplifier 88 is deenergized to terminate the transmission of carrier current of frequency F2 from the called station and thus cause the release of relays 51, 52 and 58 of carrier terminal equipment CT and the release of relays 76 and 90 at the calling station. The release of relay 90 at the calling station connects crystal 92 into the oscillator circuit of oscillator-modulator 88 in place of crystal 91, whereby the carrier current transmitted therefrom is current of frequency F2 instead of frequency F1. Thus relay 51 is reoperated soon enough to prevent the release of connector C2 until the handset is hung up at the calling station; at which time, relay 93 releases and oscillator-modulator-amplifier 88 is deenergized at the calling station, relays 51 and 52 are released at the carrier terminal equipment CT, and connector C2 is restored to normal.

In case the called subscriber fails to answer, the calling subscriber answers and carrier current of frequency F2 is transmitted over line PL to operate relays 51, 52 and 58 and release relay 57 of the carrier terminal equipment CT. Ringing is tripped due to the operation of relay 51; and, when the calling subscriber hangs up, relays 51, 52 and 58 release at the carrier terminal, and relay 93 releases and oscillator-modulator-amplifier 88 is deenergized at the calling station.

What is claimed is:

1. In a telephone system, a telephone line, a power line, a carrier terminal station interconnecting said lines, a plurality of telephone subscriber stations connected to said power line, each of said subscriber stations comprising a carrier current transmitter arranged to transmit carrier current of either one of two frequencies and a carrier current receiver arranged to receive carrier current of the other of the two frequencies, and means at each subscriber station comprising the carrier current receiver and a relay for automatically interchanging the transmitting and receiving carrier frequencies responsive to energization of the receiver by carrier current of a particular one of said two frequencies.

2. In a telephone system comprising subscriber lines and switching means for connecting calling and called lines, a power transmitting line, a plurality of telephone subscriber stations connected to said power line, each of said stations comprising carrier current transmitting and receiving means for transmitting and receiving over the power line voice and signal modulated carrier current of either one of two carrier frequencies and means for transmitting a particular signal consisting of an impulse of carrier current of one of said two carrier frequencies modulated by current of the power frequency, and means comprising carrier terminal equipment connecting said power line to one of said subscriber lines, said carrier terminal equipment comprising carrier current transmitting means for transmitting over said power line to any of said stations carrier current of the other of said two carrier frequencies and for modulating said carrier current with voice and signal currents incoming over said one subscriber line, carrier receiving means for receiving over said power line from any of said stations voice and signal modulated carrier current of said one of the two carrier frequencies, means connected to said carrier receiving means for transmitting the voice and signal current components over said one telephone line, and means controlled by the carrier receiving means of said carrier terminal equipment responsive to said particular signal for preventing the transmission of carrier current over the power line from said carrier terminal equipment.

3. In a telephone system, a telephone line, a power line, a carrier terminal station interconnecting said lines, a plurality of telephone subscriber stations connected to said power line, each of said subscriber stations comprising carrier current transmitting means arranged to transmit carrier current of either one of two frequencies and carrier current receiving means arranged to receive carrier current of the other of the two frequencies, means including said carrier current transmitting means at each subscriber station for transmitting over said power line to said carrier terminal station a signal consisting of carrier current of a particular one of said frequencies modulated by current of the power frequency, means at said carrier terminal station for transmitting over the power line carrier current of the other one of said two frequencies, and means at said carrier terminal station effective responsive to said signal to prevent the transmission of carrier current over the power line from the carrier transmitting means at said carrier terminal station.

4. In a telephone system, a telephone line, a power line, a carrier terminal station interconnecting said lines, a plurality of telephone subscriber stations connected to said power line, each of said subscriber stations comprising a carrier current transmitter arranged to transmit carrier current of either one of two frequencies and a carrier current receiver arranged to receive carrier current of the other of the two frequencies, means at each subscriber station comprising the carrier current receiver and a relay for automatically interchanging the transmitting and receiving carrier frequencies responsive to energization of the receiver by carrier current of one of said two frequencies, means at each subscriber station for transmitting over said power line to said carrier terminal station a signal consisting of carrier current of said one carrier frequency modulated by current of the power frequency, carrier transmitting means at said carrier terminal station for transmitting over the power line carrier current of the other of said two frequencies, carrier receiving means at said carrier terminal station and means controlled by said carrier receiving means responsive to said signal for preventing the transmission of carrier current of said other frequency from said carrier terminal station.

5. In a telephone system, a telephone line, a power line, a carrier terminal station interconnecting said lines, a plurality of telephone subscriber stations connected to said power line, each of said subscriber stations comprising a carrier current transmitter arranged to transmit carrier current of either one of two frequencies and a carrier current receiver arranged to receive carrier current of the other of the two frequencies, means at each subscriber station comprising the carrier current receiver and a relay for automatically interchanging the transmitting and receiving carrier frequencies responsive to energization of the receiver by carrier current of a particular one of said two frequencies, and means at said carrier terminal station for marking said telephone line busy as long as carrier current is being received over said power line from any one of said subscriber stations.

6. In a telephone system, a telephone line, a power line, a carrier terminal station interconnecting said lines, a plurality of telephone subscriber stations connected to said power line, said carrier terminal station comprising means for transmitting carrier current of a first frequency over said power line and for modulating said carrier current by voice and signal currents incoming over said telephone line, means for receiving carrier current of a second frequency incoming over said power line from any of said subscriber stations and for transmitting over said telephone line voice and signal currents by which said carrier current is modulated, means responsive to carrier current of said second frequency modulated by current of the power frequency incoming over the power line from any of said subscriber stations for preventing the transmission of carrier current from said carrier terminal station, means at each of said subscriber stations for receiving carrier current of either of said first and second frequencies and for transmitting carrier current of the other said first and second frequencies, means for modulating the transmitted carrier current with voice or signal currents, and means for transmitting a signal consisting of carrier current of said second frequency modulated by current of the power frequency.

7. In a telephone system, a telephone line, a power line, a carrier terminal station interconnecting said lines, a plurality of telephone subscriber stations connected to said power line, said carrier terminal station comprising means for transmitting carrier current of a first frequency over said power line and for modulating said carrier current by voice and signal currents incoming over said telephone line, means for receiving carrier current of a second frequency incoming over said power line from any of said subscriber stations and for transmitting over said telephone line voice and signal currents by which said carrier current is modulated, and means controlled by said carrier current receiving means responsive to carrier current of said second frequency modulated by current of the power frequency for preventing the transmission of carrier current over the power line from the carrier transmitting means of said carrier terminal station, means at each of said subscriber stations for receiving carrier current of either of said first and second frequencies and for transmitting carrier current of the other said first and second frequencies, means for modulating the transmitted carrier current with voice or signal currents, and means for transmitting a signal consisting of an impulse of current of said second frequency modulated by current of the power frequency, said last means comprising a manually operated key, contact springs controlled by the key and means for locking said springs in normal and in actuated positions.

8. In a telephone system, a telephone line, a power line, a carrier terminal station interconnecting said lines, a plurality of telephone subscriber stations connected to said power line, said carrier terminal station comprising carrier current transmitting means for transmitting over said power line carrier current of a first frequency, a means for modulating said carrier current by speech and by ringing current incoming over said telephone line, means for receiving carrier current of a second frequency incoming over said power line, means for transmitting over said telephone line any voice frequency current with which the incoming carrier current of said second frequency is modulated, means for closing a direct bridge across said telephone line and for maintaining the closure of said bridge as long as carrier current of said second frequency is being received over the power line, and means responsive to incoming carrier current of said second frequency modulated at the power frequency for preventing the transmission of carrier current of said first frequency over said power line, each of said subscriber stations comprising a telephone receiver, a receiver hook and contact springs controlled thereby, means effective upon removal of said receiver from said hook to transmit carrier current of said second frequency over said power line, means including a telephone transmitter for modulating the carrier current of said second frequency with speech currents, means including an impulse dial for modulating the carrier current of said second frequency with dial impulses, carrier receiving means for receiving carrier current of said first frequency or said second frequency, a ringer, means including said carrier receiving means for operating said ringer responsive to ringing modulated carrier current of said first frequency incoming over said power line while said receiver hook is in normal position, means including said carrier receiving means for energizing said receiver responsive to voice modulated carrier current incoming over said power line while said receiver hook is not in normal position, means responsive to carrier current of said second frequency incoming over said power line at the time the receiver is removed from the receiver hook for changing the carrier transmitting means to transmit carrier current of said first frequency instead of carrier current of said second frequency, and means for transmitting an impulse of carrier current of said second frequency modulated by current of the power frequency.

9. In a telephone system, a telephone line, a power line, a carrier terminal station interconnecting said lines, a plurality of telephone subscriber stations connected to said power line, said carrier terminal station comprising means including carrier transmitting means for transmitting voice and ringing modulated carrier current of a first frequency over said power line, carrier receiving means for receiving voice and signal modulated carrier current of a second frequency, means connected to said carrier receiving means for transmitting the voice and signal current components over said telephone line, and means responsive to an impulse of carrier current modulated at the power frequency incoming over the power line for preventing the transmission of carrier current of said first frequency over the power line, each of said subscriber stations comprising a telephone transmitter and receiver, a receiver hook on which said receiver normally rests, carrier receiving means normally tuned to carrier current of said first frequency, carrier transmitting means normally tuned to said second frequency, a ringer, means for actuating said ringer responsive to ringing modulated carrier current of said first frequency, contact means controlled by said receiver hook for opening the ringer circuit and for rendering said receiver responsive to voice currents with which carrier current incoming over the power line is modulated, means rendered effective by removal of said receiver for tuning said carrier transmitting means to transmit carrier current of said first frequency instead of said second frequency in case carrier current of said second frequency is being received at the time of said removal, means including said telephone transmitter for modulating the carrier current transmitted over the power line, and means comprising a key and contacts controlled by the key for modulating the carrier current transmitted over the power line with current of the power frequency while said receiver is removed from the receiver hook after operation of the key, said key being normally locked in unoperated position and arranged to lock in operated position when operated while the receiver is off the hook and to be again locked in normal position when the receiver is replaced on the hook.

10. In a telephone system, a telephone line, a power line, a carrier terminal equipment interconnecting said lines, a plurality of telephone subscriber stations connected to said power line, each of said stations comprising carrier current transmitting means arranged to transmit voice and signal modulated carrier current of either one of two frequencies and carrier current receiving means arranged to receive voice and signal modulated carrier current of the other of the two frequencies, means at each subscriber station including the carrier current transmitting means thereat for transmitting over said power line to said carrier terminal station voice and signal modulated carrier current of a particular one of said two frequencies, means for modulating the carrier current of said one of the two frequencies with current of the power frequency when a reverting call is being made, a carrier current transmitter in said terminal equipment arranged to transmit over said power line voice and signal modulated carrier current of the other of said two frequencies, a carrier current receiver in said carrier terminal equipment for receiving from the power line voice and signal modulated carrier current of said one of said two frequencies, and means in said carrier terminal equipment including said carrier receiver and including a relay tuned to respond only to power frequency components in the carrier current incoming over said power line for preventing the transmission of carrier current of said other frequency over the power line from said terminal equipment on a reverting call.

JOHN M. BARSTOW.
ALBERT G. LANG.

REFERENCES CITED

The following references are of record in the file of this patent:

UNITED STATES PATENTS

| Number | Name | Date |
|---|---|---|
| 1,226,389 | Schulz | May 15, 1917 |
| 1,773,613 | Clark | Aug. 19, 1930 |
| 2,289,048 | Sandalls | July 7, 1942 |
| 2,294,905 | Honaman | Sept. 8, 1942 |
| 2,378,326 | Rees | June 12, 1945 |
| 2,383,908 | Bowers | Aug. 28, 1945 |
| 2,440,239 | Almquist | Apr. 27, 1948 |